US012454939B2

(12) United States Patent
Yarbrough et al.

(10) Patent No.: US 12,454,939 B2
(45) Date of Patent: Oct. 28, 2025

(54) SEGMENTED ROTOR BLADE FOR A WIND TURBINE AND METHODS FOR JOINING THE SAME

(71) Applicant: General Electric Company, Schenectady, NY (US)

(72) Inventors: Aaron Alpheus Yarbrough, Greenville, SC (US); Christopher Daniel Caruso, Greenville, SC (US); Andrew Mitchell Rodwell, Greenville, SC (US); Donald Joseph Kasperski, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/624,994

(22) PCT Filed: Jun. 30, 2020

(86) PCT No.: PCT/US2020/040259
§ 371 (c)(1),
(2) Date: Jan. 5, 2022

(87) PCT Pub. No.: WO2021/007068
PCT Pub. Date: Jan. 14, 2021

(65) Prior Publication Data
US 2022/0282699 A1 Sep. 8, 2022

(51) Int. Cl.
*F03D 1/06* (2006.01)
*F03D 13/10* (2016.01)
(52) U.S. Cl.
CPC ........... *F03D 1/0675* (2013.01); *F03D 13/10* (2016.05); *F05B 2230/60* (2013.01); *F05B 2240/302* (2013.01); *F05B 2260/301* (2013.01)

(58) Field of Classification Search
CPC ...... F03D 1/0675; F03D 1/0683; F03D 13/10; F05B 2230/60; F05B 2240/302; F05B 2260/301
See application file for complete search history.

(56) References Cited

U.S. PATENT DOCUMENTS

| 7,997,874 B2 * | 8/2011 | van der Bos | ........... | F03D 13/10 |
| | | | | 416/223 R |
| 8,348,622 B2 * | 1/2013 | Bech | ................... | B29C 66/7212 |
| | | | | 416/223 R |

(Continued)

FOREIGN PATENT DOCUMENTS

| EP | 2532880 A2 | 12/2012 | |
| NL | 1001200 C2 * | 3/1997 | ......... B29C 66/1142 |
| WO | WO2015/011292 A1 | 1/2015 | |

OTHER PUBLICATIONS

Machine Translation of NL 1,001,200 C2; Retrieved from Google Patents on May 5, 2023 (Year: 2023).*

(Continued)

*Primary Examiner* — Sang K Kim
(74) *Attorney, Agent, or Firm* — Dority & Manning, P.A.

(57) ABSTRACT

A segmented rotor blade for a wind turbine. The segmented rotor blade including at least a first blade segment and a second blade segment extending in opposite directions from a joint. Each of the first and second blade segments including at least one shell member defining an airfoil surface. A joint assembly coupling the first blade segment to the second blade segment via a dovetail connection at the joint. The joint assembly including at least one receiving section defining a receiving cavity, a joining structure received within the at least one receiving section to establish a dovetail connection, and a securement assembly securing (Continued)

the joining structure within the at least one receiving section so as to secure the dovetail connection.

17 Claims, 12 Drawing Sheets

(56) References Cited

U.S. PATENT DOCUMENTS

| | | |
|---|---|---|
| 9,410,529 B2 | 8/2016 | Grove-Nielsen |
| 2015/0240780 A1* | 8/2015 | Leonard ............... F03D 1/0675 |
| | | 416/204 R |
| 2016/0341177 A1* | 11/2016 | Bech .................... F03D 1/0675 |
| 2018/0223796 A1 | 8/2018 | Yarbrough et al. |

OTHER PUBLICATIONS

PCT International Search Report & Written Opinion Corresponding to PCT/US2020/040259 on Oct. 21, 2020.

* cited by examiner

SEGMENTED ROTOR BLADE FOR A WIND TURBINE AND METHODS FOR JOINING THE SAME

PRIORITY INFORMATION

The present application claims priority to PCT Application Serial Number PCT/US2019/040795 filed on Jul. 8, 2019, and PCT Application Serial Number PCT/US2020/040259, filed Jun. 30, 2020, which are incorporated herein by reference in their entirety.

FIELD

The present disclosure relates in general to wind turbines, and more particularly to segmented rotor blades and methods for joining the same.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy the electrical energy may be transmitted to a converter and/or a transformer housed within the tower and subsequently deployed to a utility grid.

In recent years, wind turbines for wind power generation have increased in size to achieve improvements in power generation efficiency and to increase the amount of power generation. Along with the increase in the amount of wind power generation, wind turbine rotor blades have also increased in size. With larger rotor blades, additional difficulties also occur, such as difficulties with manufacturing, transportation, and handling, just to name a few. As a result, larger rotor blades are often manufactured in segments.

Various methods have been developed for joining rotor blade segments. For example, bolted and scarf joint connections are relatively common to the wind blade industry. However, such approaches have known drawbacks. For example, a bolted-joint connection typically has a required maintenance interval and may be heavier than blades without bolted joints. Though scarf joints typically have a lower weight than bolted joints, they are often difficult to form and control in field conditions. In many cases, joining blade segments with a scarf joint requires dedicated buildings, tooling, and other stationary machinery to assist in the final assembly of the blade.

Thus, the art is continuously seeking new and improved systems and methods for joining blade segments. Accordingly, a segmented rotor blade for a wind turbine and methods for joining the same that addresses the aforementioned issues would be advantageous.

BRIEF DESCRIPTION

Aspects and advantages of the invention will be set forth in part in the following description, or may be obvious from the description, or may be learned through practice of the invention.

In one aspect, the present disclosure is directed to a segmented rotor blade for a wind turbine. The segmented rotor blade may include at least a first blade segment and a second blade segment extending in opposite directions from a joint. Each of the first and second blade segments may include at least one shell member defining an airfoil surface. The segmented rotor blade may include a joint assembly coupling the first blade segment to the second blade segment via a dovetail connection at the joint. The joint assembly may include at least one receiving section defining a receiving cavity having a receiving profile. The joint assembly may also include a joining structure received within the at least one receiving section. The joining structure may define a joining profile corresponding to the receiving profile. The joining profile and the receiving profile may form a dovetail profile. The joining structure and the at least one receiving section may form the dovetail connection. The joint assembly may also include a securement assembly securing the joining structure within the at least one receiving section so as to secure the dovetail connection.

In an embodiment, the receiving section(s) and the joining structure may extend along a plane defined in a chordwise direction.

In an embodiment, the receiving section(s) and the joining structure may extend along an arc defined between a leading edge and a trailing edge of the segmented rotor blade.

In another embodiment, the joint may have a deviation from a chordwise axis of less than or equal to 45-degrees.

In another embodiment, the joining structure may also include at least one end having a contour corresponding to a portion of a contour of the airfoil surface.

In an additional embodiment, the joint assembly may also include at least one spacer element contained within the at least one receiving section. The spacer element(s) may have a spacer profile corresponding to at least a portion of the receiving cavity.

In an embodiment, the securement assembly may include at least one pre-tensioned bolt positioned within the joint assembly. The pre-tensioned bolt(s) may be oriented to exert a clamping force on the receiving section so as to maintain contact between the joining structure and the receiving section.

In an additional embodiment, the securement assembly may include a thermoplastic resin positioned between opposing bearing surfaces of the joining structure and the receiving section.

In a further embodiment, the receiving section may be formed integrally with the first blade segment and the joining structure may be formed integrally with the second blade segment or vice versa.

In an embodiment, the at least one receiving section may be a first receiving section formed integrally with the first rotor blade segment. The segmented rotor blade may also include a second receiving section formed integrally with the second blade segment. The joining structure may be encapsulated by the first and second receiving sections so as to establish the dovetail connection along the joint.

In an additional embodiment, the at least one receiving section may be a first plurality of receiving sections distributed along a cord of the segmented rotor blade at a first thickness location. The joining structure may also be a first plurality of joining structures received within the first plurality of receiving sections at the first thickness location. The joint assembly may also include a second plurality of receiving sections distributed along the chord at a second thickness location. Each receiving section of the first and second pluralities of receiving sections may define a receiving cavity having a receiving profile. The joint assembly may further include a second plurality of joining structures received within the second plurality of receiving sections at the second thickness location. Each joining structure of the first and second pluralities of joining structures may define a joining profile corresponding to the receiving profile of the corresponding receiving section. The joining profiles and the corresponding receiving profiles may form a plurality of dovetail profiles. The first and second pluralities of joining structures and the first and second pluralities of receiving sections may form a plurality of dovetail connections.

In another aspect, the present disclosure is directed to a method for joining first and second blade segments of a rotor blade of a wind turbine. The first blade segment may have at least one receiving section defining a receiving cavity having a receiving cavity profile. The second blade segment may have a joining structure defining a joining profile. The receiving and joining profiles may have corresponding interlocking geometries. The method may include placing the first and second blade segments in opposite directions from a joint and engaging the corresponding interlocking geometries of the joining structure and the receiving section so as to form a joint assembly having a dovetail connection. The method may also include securing the joining structure and the receiving section together via a securement assembly.

In an embodiment, engaging the corresponding interlocking geometries of the joining structure and the receiving section may also include applying a rotational force to the joining structure so as to move the joining structure along an arc defined by the receiving section.

In an additional embodiment, the method may also include inserting at least one spacer element into the receiving section.

In an embodiment, securing the joining structure and the receiving section may also include inserting at least one pre-tension bolt into a recess defined by the receiving section and applying a torque to the pre-tension bolt so as to apply a clamping pressure onto the joining structure.

In an embodiment, securing the joining structure and the receiving section may include applying a thermoplastic resin to the joining structure and/or the receiving section. Securing the joining structure and the receiving section may also include applying a clamping pressure to the receiving section and curing the thermoplastic resin.

In a further embodiment, the second blade segment may also include least one receiving section. The method may also include aligning the first and second blade segments spanwise along a pitch axis and inserting the joining structure into the receiving sections of the first and second blade segment so as to establish the dovetail connection.

In another aspect, the present disclosure is directed to a wind turbine. The wind turbine may include a tower secured atop a foundation, a nacelle mounted atop the tower, and a rotor mounted to the nacelle. The rotor may include a rotatable hub having at least one segmented rotor blade coupled thereto. The segmented rotor blade(s) may include at least a first blade segment and a second blade segment extending in opposite directions from a joint. Each of the first and second blade segments may include at least one shell member defining an airfoil surface and a joint assembly coupling the first blade segment to the second blade segment via a dovetail connection at the joint. The joint assembly may include any of the elements and features disclosed herein. A These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
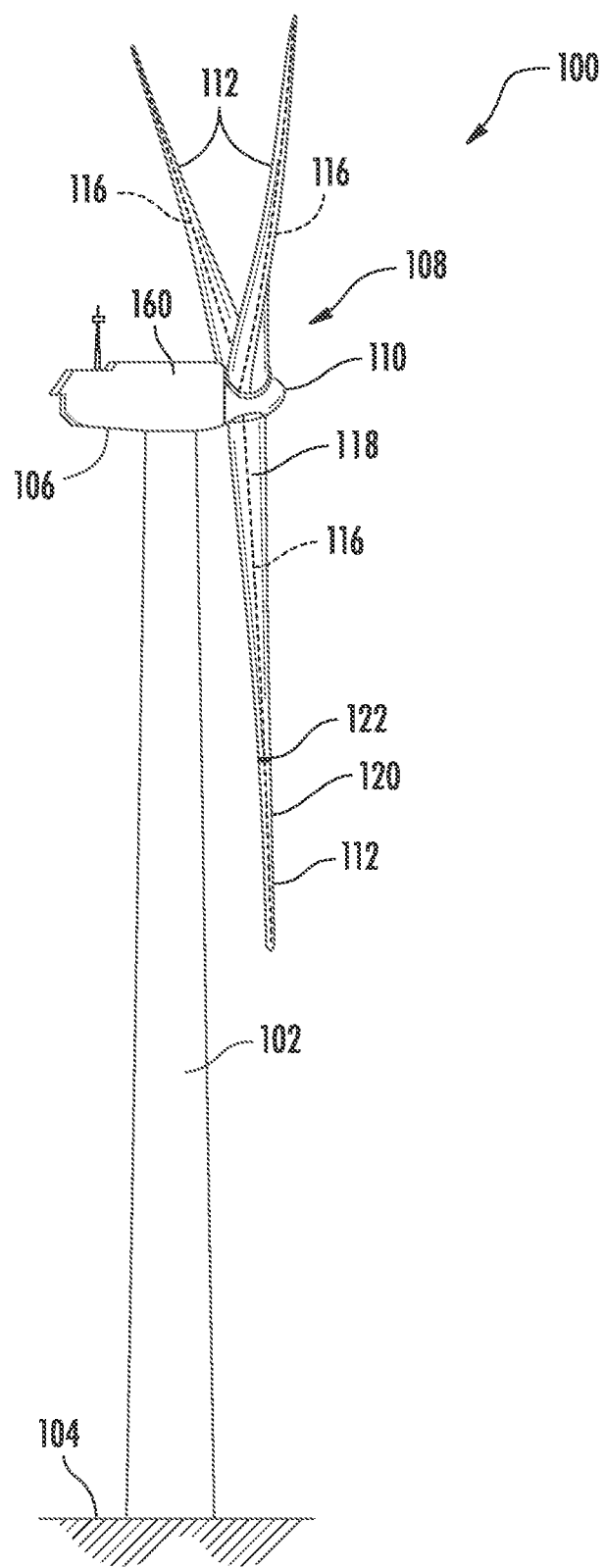
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a segmented rotor blade for a wind turbine. The segmented rotor blade may include, at least, a first blade segment and a second blade segment joined at a chordwise joint. The chordwise joint may include at least one receiving section defining a receiving cavity and a joining structure received within the receiving cavity. For example, the joining structure may extend between the blade segment's leading and trailing edges and have a generally dovetail cross-sectional shape. To join the blade segments, an end of the joining structure of the second blade segment may be inserted through an opening in the surface of the first blade segment and moved in a chordwise direction through the receiving cavity until a limit is reached. With the joining structure inserted into the receiving cavity, a plurality of corresponding bearing surfaces of the joining structure and the receiving section may transmit loads between the segments of the rotor blade.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 having a pitch axis 116 coupled to and extending outwardly from the hub 110. For example, in the illustrated embodiment, the rotor 108 includes three rotor blades 112. However, in an alternative embodiment, the rotor 108 may include more or less than three rotor blades 112. As shown, each rotor blade 112 may be segmented and may include a first blade segment 118 and a second blade segment 120 coupled at a joint 122. Each segmented rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

Figure 2:
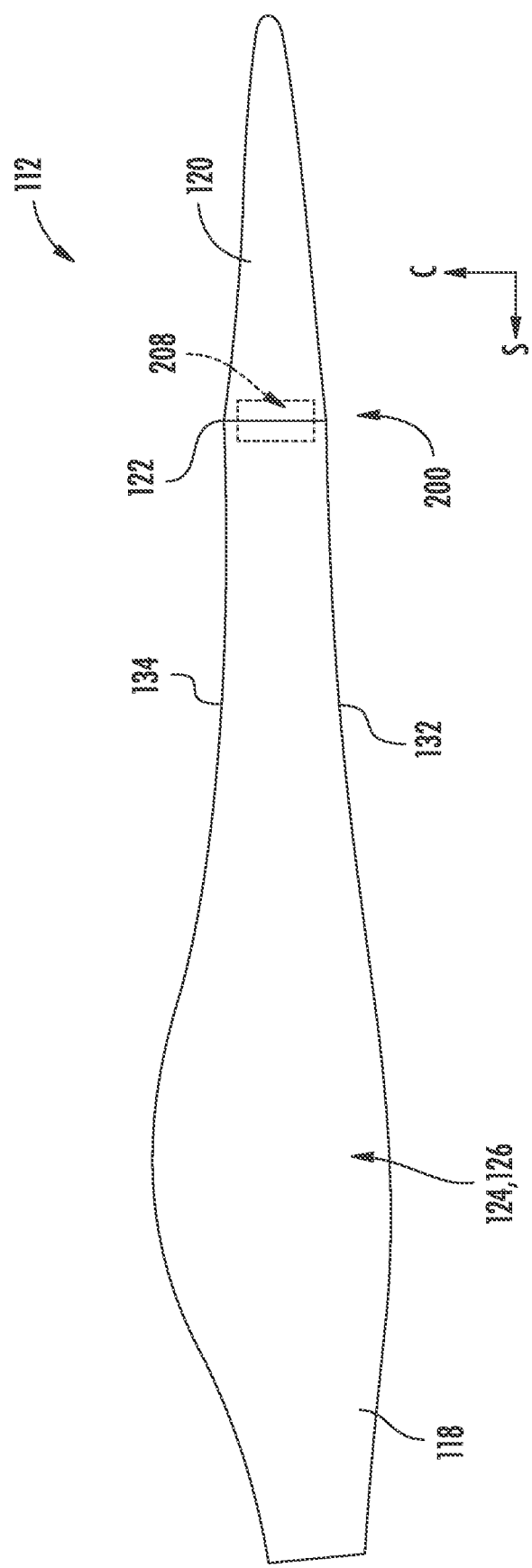
FIG. 2 illustrates a plan view of one embodiment of a segmented rotor blade having multiple blade segments according to the present disclosure.
Figure 3:
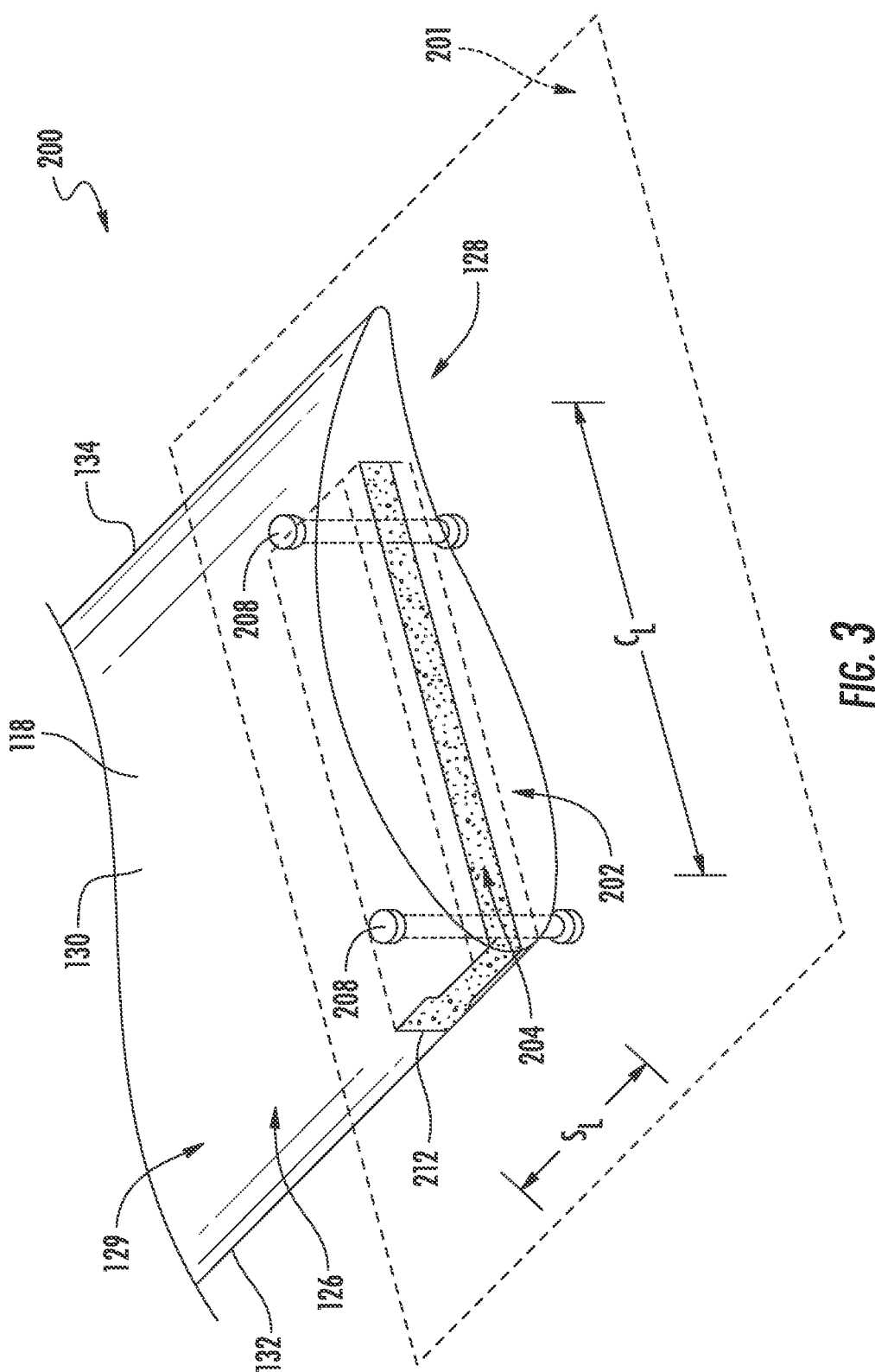
FIG. 3 illustrates a perspective view of one of the blade segments of the segmented rotor blade of FIG. 2 having a receiving section.

Referring now to FIG. 2, a plan view of one of the segmented rotor blades 112 of FIG. 1 is illustrated. As shown, the segmented rotor blade 112 may include a first blade segment 118 and a second blade segment 120. The first blade segment 118 and the second blade segment 120 may each extend in opposite directions from a chordwise joint 122. Each of the first and second blade segments 118, 120 may include at least one shell member 124 defining an airfoil surface 126. The airfoil surface 126 may include a pressure side 128 (FIG. 3) and a suction side 129 (FIG. 3). Each of the first and second blade segments 118, 120 may also include a leading edge 132 and a trailing edge 134. A positional relationship between the components of the segmented rotor blade(s) 112 may be determined in relation to a chordwise axis (C) extending from the leading edge 132 to the trailing edge 134 and a spanwise axis (S) oriented perpendicular to the chordwise axis and extending along the pitch axis 116 of the segmented rotor blade(s) 112.

Figure 4:
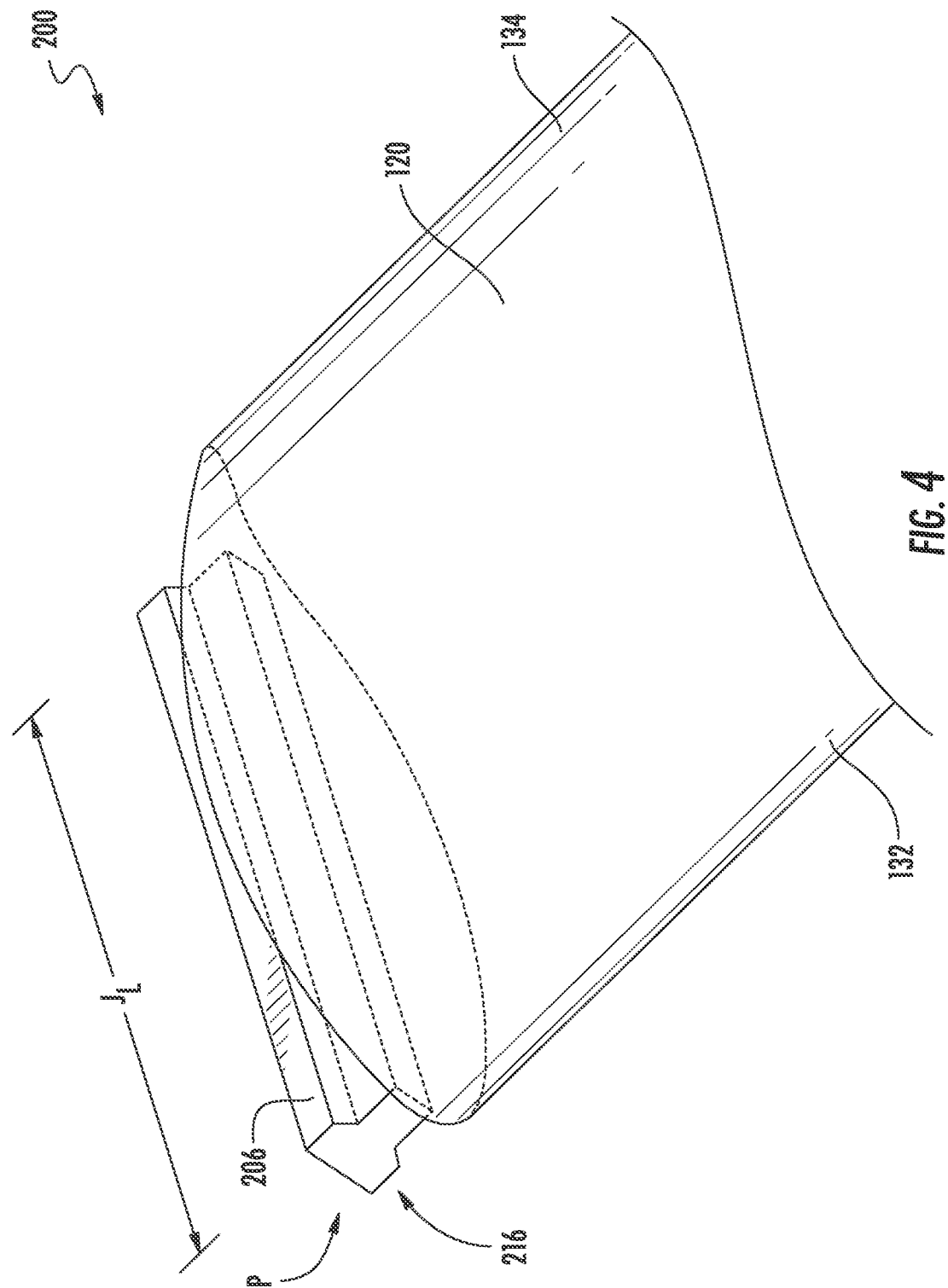
FIG. 4 illustrates a perspective view of one of the blade segments of the segmented rotor blade of FIG. 2 having a joining structure.
Figure 5:
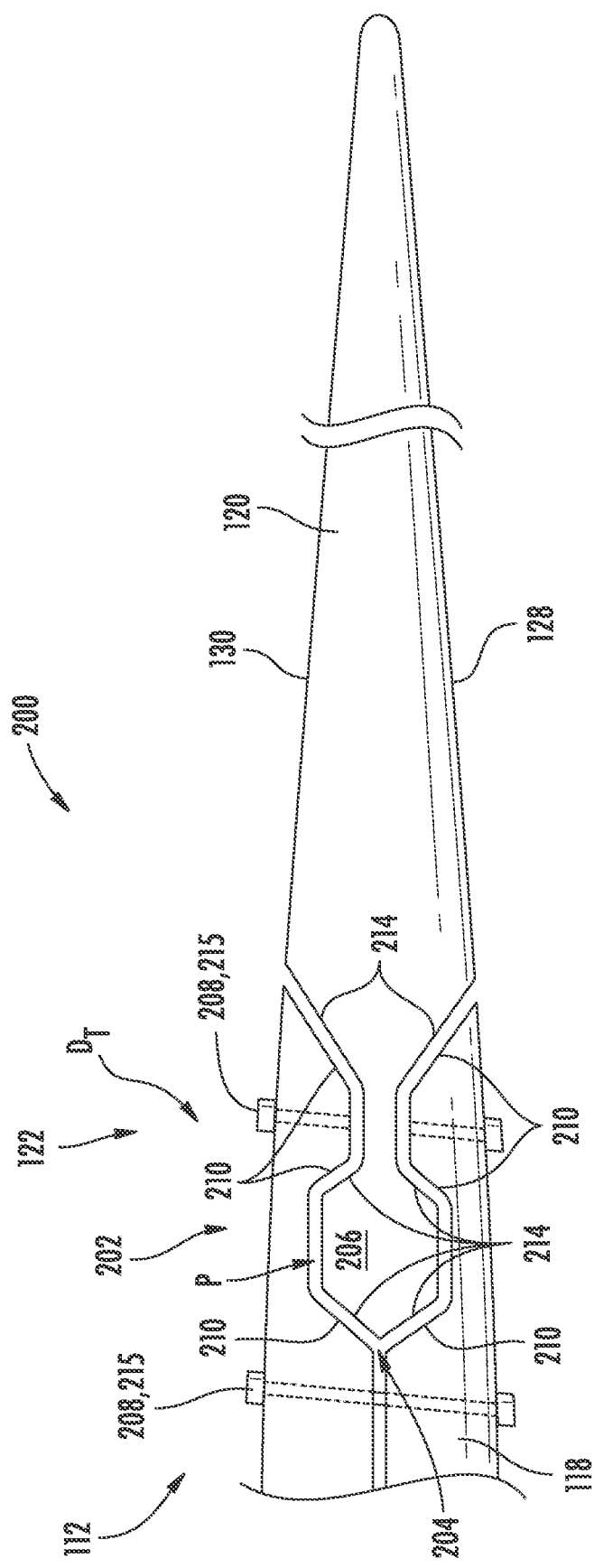
FIG. 5 illustrates a cross-sectional, spanwise view of an embodiment of a joint assembly of the segmented rotor blade according to the present disclosure.

Referring now to FIG. 3-5, various embodiments of a joint assembly 200 for coupling the first blade segment 118 to the second blade segment 120 at the joint 122 with a dovetail connection ($D_T$) are depicted. In an embodiment, the joint assembly 200 may include at least one receiving section 202 defining a receiving cavity 204. The receiving cavity 204 may define/have a receiving profile. The joint assembly 200 may also include a joining structure 206. Further, as shown, the joining structure 206 may be received within the receiving section(s) 202. The joining structure 206 may define a joining profile (P) corresponding to the receiving profile of the receiving cavity 204. As particularly depicted in FIG. 5, the joining profile (P) and the receiving profile may form a dovetail profile so that the joining structure 206 and the receiving cavity 204 may form the dovetail connection ($D_T$). In an embodiment, the joint assembly 200 may also include a securement assembly 208 securing the joining structure 206 within the receiving section(s) 202 so as to secure the dovetail connection ($D_T$). It should be appreciated that, as used herein, the term "dovetail connection ($D_T$)" refers not only to connections having a generally triangular cross-section but also to other connections having pluralities of corresponding, interlocking bearing surfaces 210.

In an embodiment, such as depicted in FIGS. 3 and 4, the receiving section(s) 202 defining the receiving cavity 204 may lie and extend in a linear fashion along a plane 201 defined by the chordwise axis (C) and the spanwise axis (S). For example, the receiving section(s) 202 may extend along a line connecting the leading edge 132 to the trailing edge 134, thus extending generally along the chordwise axis (C). In an alternative embodiment, the receiving section(s) 202 may extend along other lines oriented parallel to the chordwise axis (C).

In an embodiment, still referring to FIG. 3, the receiving section(s) 202 may have a maximal chordwise length ($C_L$) and a maximal spanwise length ($S_L$). The maximal chordwise length ($C_L$) may be greater than the maximal spanwise length ($S_L$).

As particularly depicted in FIG. 5, in an embodiment, the receiving section(s) 202 may include a first plurality of bearing surfaces 210. The first plurality of bearing surfaces 210 may define the receiving cavity 204 and thus the receiving profile. The receiving cavity 204 may, in an embodiment, intersect the airfoil surface 126. As a result of the intersection, the airfoil surface 126 may define a receiving section opening 212. In at least one embodiment, the receiving section opening 212 may be defined in the leading edge 132 of the first blade segment 118. In at least one embodiment, the joining structure 206 may include at least one end 216 corresponding to a portion of a contour of the airfoil surface 126. The portion of the contour of the airfoil surface 126 may correspond to the receiving section opening 212. For example, the joining structure 206 may include at least one end 216 corresponding to an aerodynamic profile of the airfoil surface so that when installed, the aerodynamic integrity of the airfoil surface 126 is maintained and not disrupted by the receiving section opening 212 or the at least one end 216.

In an embodiment, the joining structure 206 may have a joining structure length ($J_L$) lying on and extending in a linear fashion along a plane 201 defined by the chordwise axis (C) and the spanwise axis (S). For example, the joining structure 206 may extend along the chordwise axis (C) in a linear fashion. The joining structure 206 may, in an embodiment, be in contact with the receiving section(s) 202 along the joining structure length ($J_L$). In at least one embodiment, the joining structure 206 may be formed integrally with the second blade segment 120 while the receiving section(s) 202 is formed integrally with the first blade section 118.

As particularly depicted in FIG. 5, in an embodiment, the joining structure 206 may have a second plurality of bearing surfaces 214. The second plurality of bearing surfaces 214 may define a joining profile (P) corresponding to the receiving profile of the receiving cavity 204. For example, the second plurality of bearing surfaces 214 may align with the first plurality of bearing surfaces 210 when the joining structure 206 is inserted into the receiving section(s) 202. The first and second pluralities of bearing surfaces 210, 214 may form an interlocking geometry.

Figure 9:
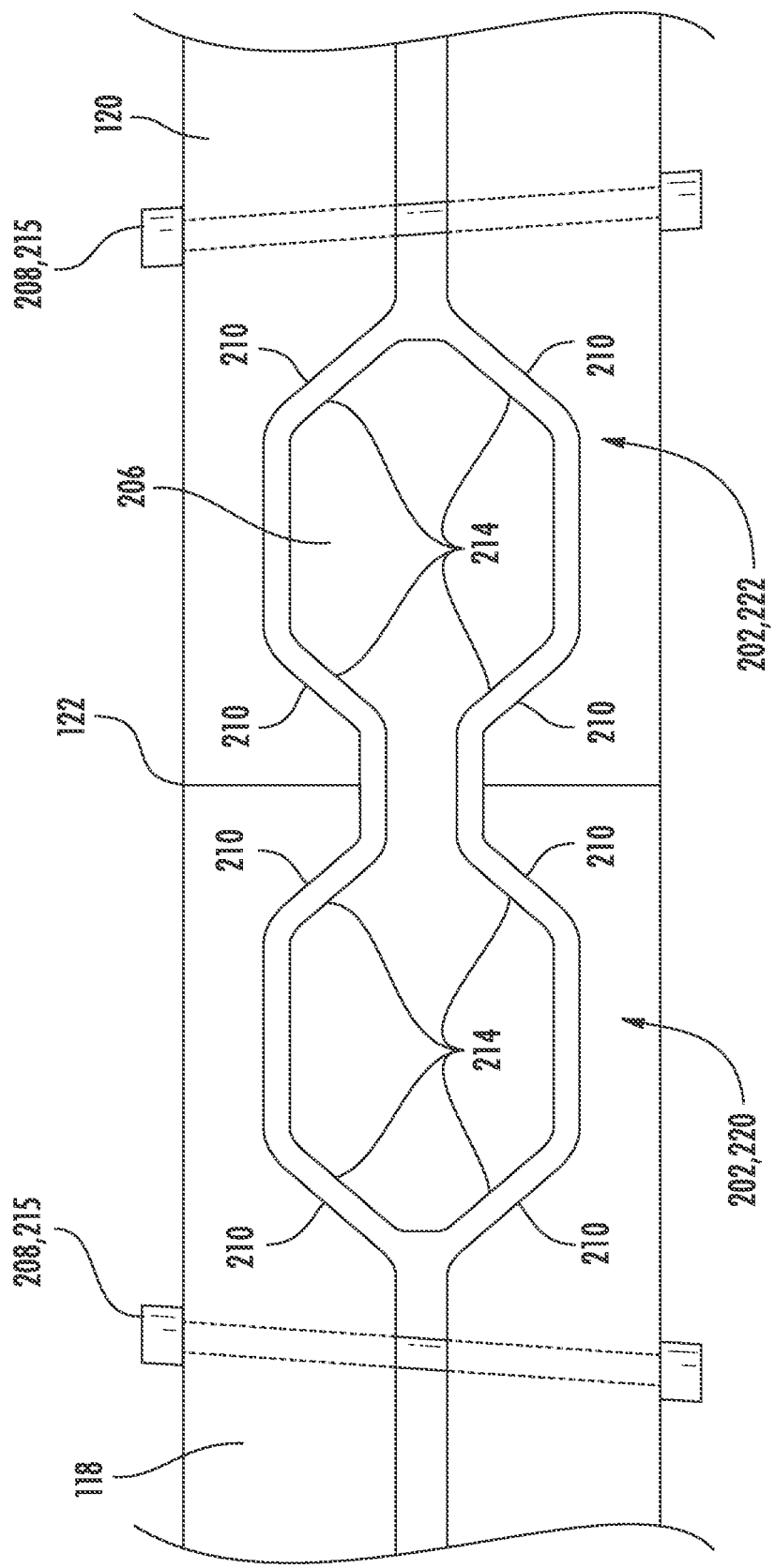
FIG. 9 illustrates a cross-sectional view of another embodiment of a joint assembly of the segmented rotor blade according to the present disclosure.
Figure 11:
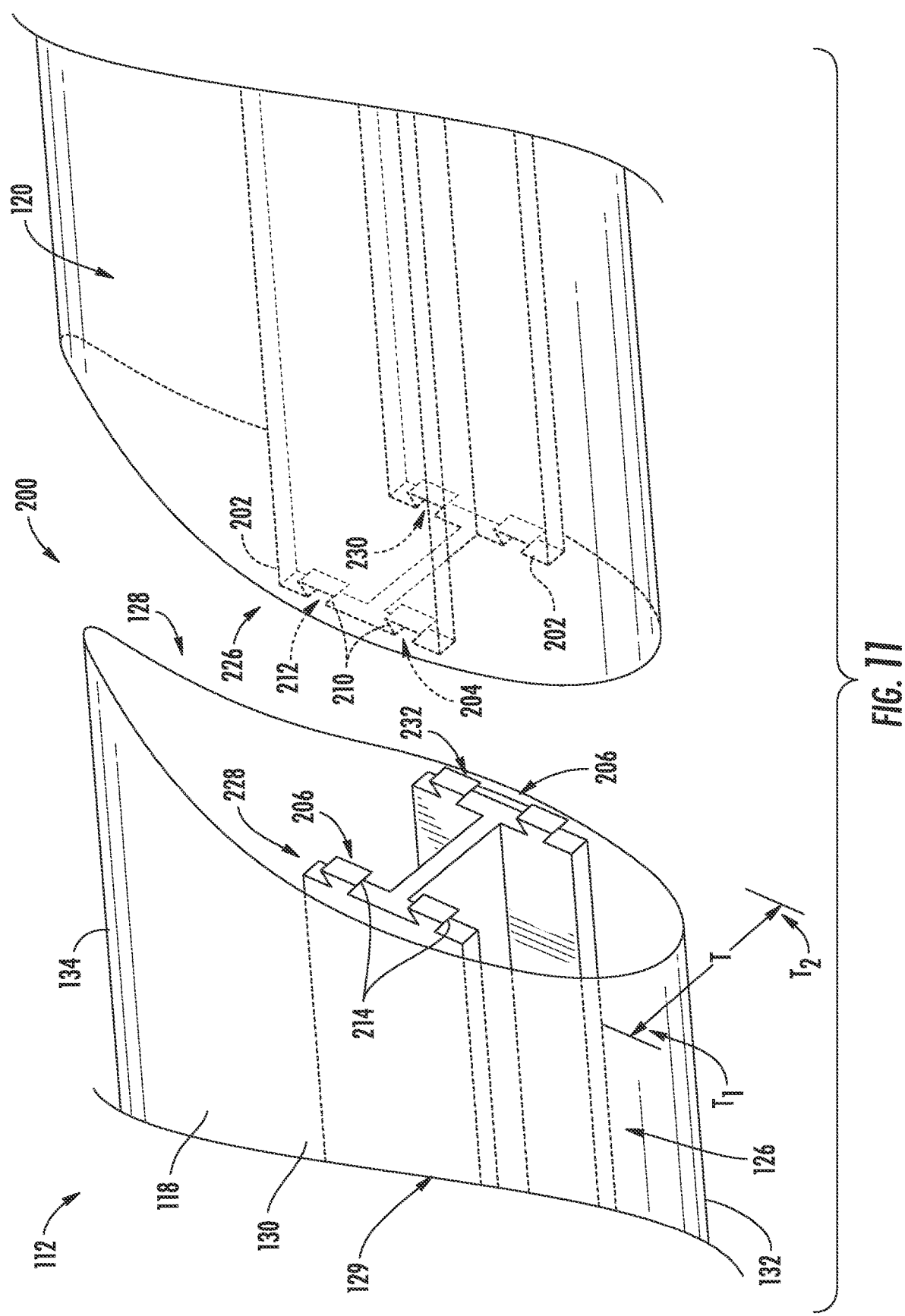
FIG. 11 illustrates a cross-sectional view of another embodiment of a joining structure of the joint assembly of the segmented rotor blade according to the present disclosure.

In an embodiment, as shown in FIGS. 5 and 9, the interlocking geometry may form a dovetail connection ($D_T$). In general, a dovetail connection may include a protrusion having a plurality of converging and/or diverging faces and a recess having mirroring faces. For example, in an embodiment, the joining structure 206 may be formed as a trapezoidal protrusion diverging outwardly from the second blade section 120, while the receiving section(s) 202 may define a trapezoidal receiving cavity 204 (or recess) tapering along the spanwise axis (S) toward the joint 122. In at least one embodiment, other interlocking geometries may be formed having any number of converging and/or diverging faces. For example, the joining structure 206 and the second plurality of bearing surfaces 214 may be formed so as to be generally T-shaped or Y-shaped. In still further embodiments, the joining structure 206 may have a cross-sectional shape resembling a portion of an hourglass or a bowtie. In an embodiment, the interlocking geometry of the dovetail connection ($D_T$) may, as depicted in FIG. 11, include a plurality of protrusions arranged in a fir-tree configuration.

As particularly depicted in FIGS. 5 and 9, in an embodiment, the securement assembly 208 may be operably coupled to the receiving section(s) 202 so as to secure the joining structure 206 within the receiving section(s) 202. In at least one embodiment, the securement assembly 208 may include at least one pre-tensioned bolt 215. The pre-tensioned bolt(s) 215 may be positioned within the joint assembly 200 and oriented to exert a clamping force on the receiving section(s) 202 so as to maintain contact between the joining structure 206 and the receiving section(s) 202. As such, the clamping force may drive an intimate contact between the first and second plurality of bearing surfaces 210, 214. In an embodiment, the pre-tensioned bolt(s) 215 may extend through the shell member 124 or may be coupled to a threaded portion of the receiving section(s) 202. In yet a further embodiment, the pre-tensioned bolt(s) 215 may be positioned to exert the clamping force without passing through the joining structure 206. It should be appreciated that maintaining contact between the first and second plurality of bearing surfaces 210, 214 may increase the ability of the joint assembly 200 to transmit a load between the first and second blade segments 118, 120.

In an additional embodiment, as shown in FIG. 2 the securement assembly 208 may include a resin positioned between opposing bearing surfaces 210, 214 of the joining structure 206 and the receiving section(s) 202. The resin may be a thermoset or a thermoplastic resin known in the art.

Figure 6:
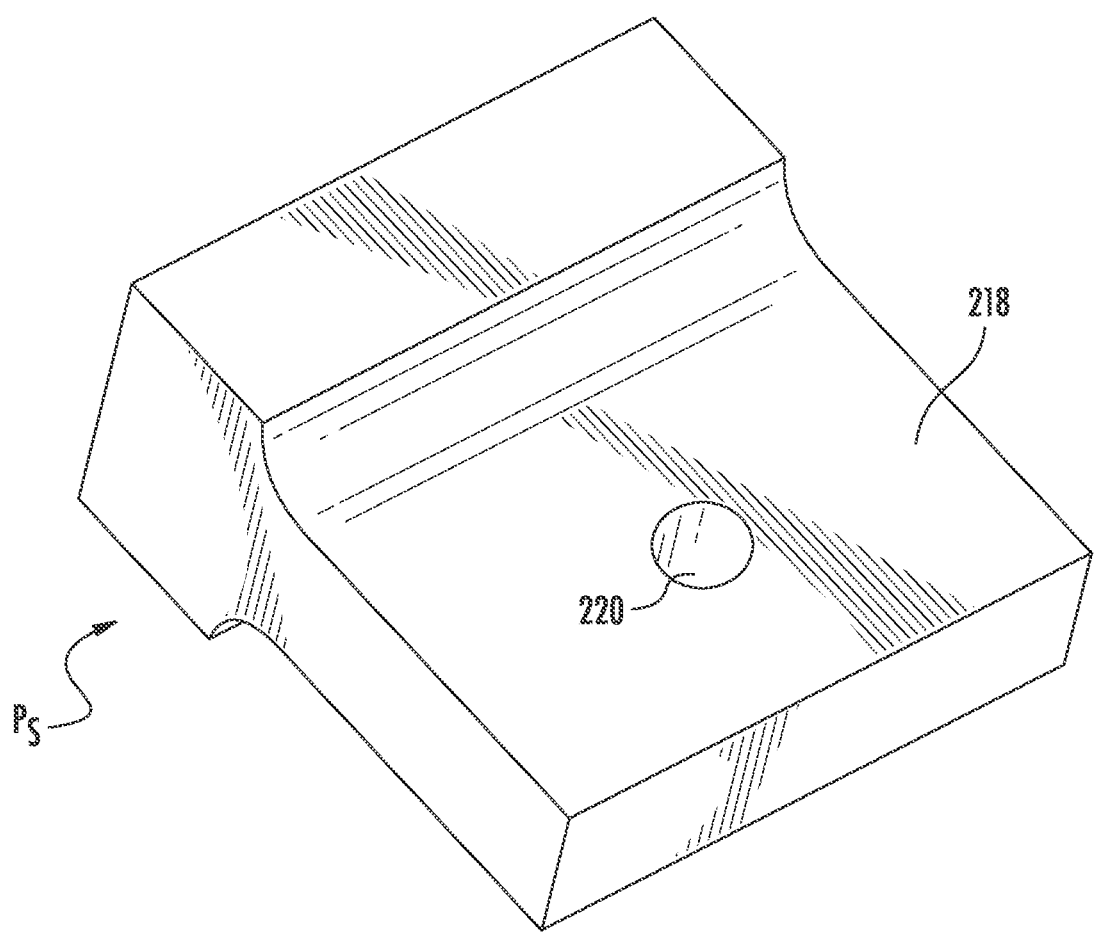
FIG. 6 illustrates a perspective view of a spacer element configured to be inserted into a receiving section of a blade segment of a rotor blade according to the present disclosure.

Referring now to FIG. 6, a perspective view of one embodiment of a spacer element 218 configured to be inserted into the receiving section(s) 202 is illustrated. In at least one embodiment, the spacer element(s) 218 may be contained within the receiving section(s) 202. In addition, the spacer element(s) 218 may have a spacer profile ($P_S$) corresponding to at least a portion of the receiving cavity 204. The spacer element(s) 218 may also define a securing hole 224 for receiving a pre-tensioned bolt 215. In an embodiment, the spacer element 218 may be inserted into the receiving cavity 204, then the joining structure 206 may be inserted, and then another spacer element 218 may be inserted into the receiving cavity 204. In at least one embodiment, the spacer element(s) 218 may have a contour corresponding to a portion of a contour of the airfoil surface 126 and may be used to close the receiving section opening 212. In several embodiments, the spacer element(s) 218 may be a rigid element, an elastomeric element, a compressible element, or any other suitable spacer.

Figure 7:
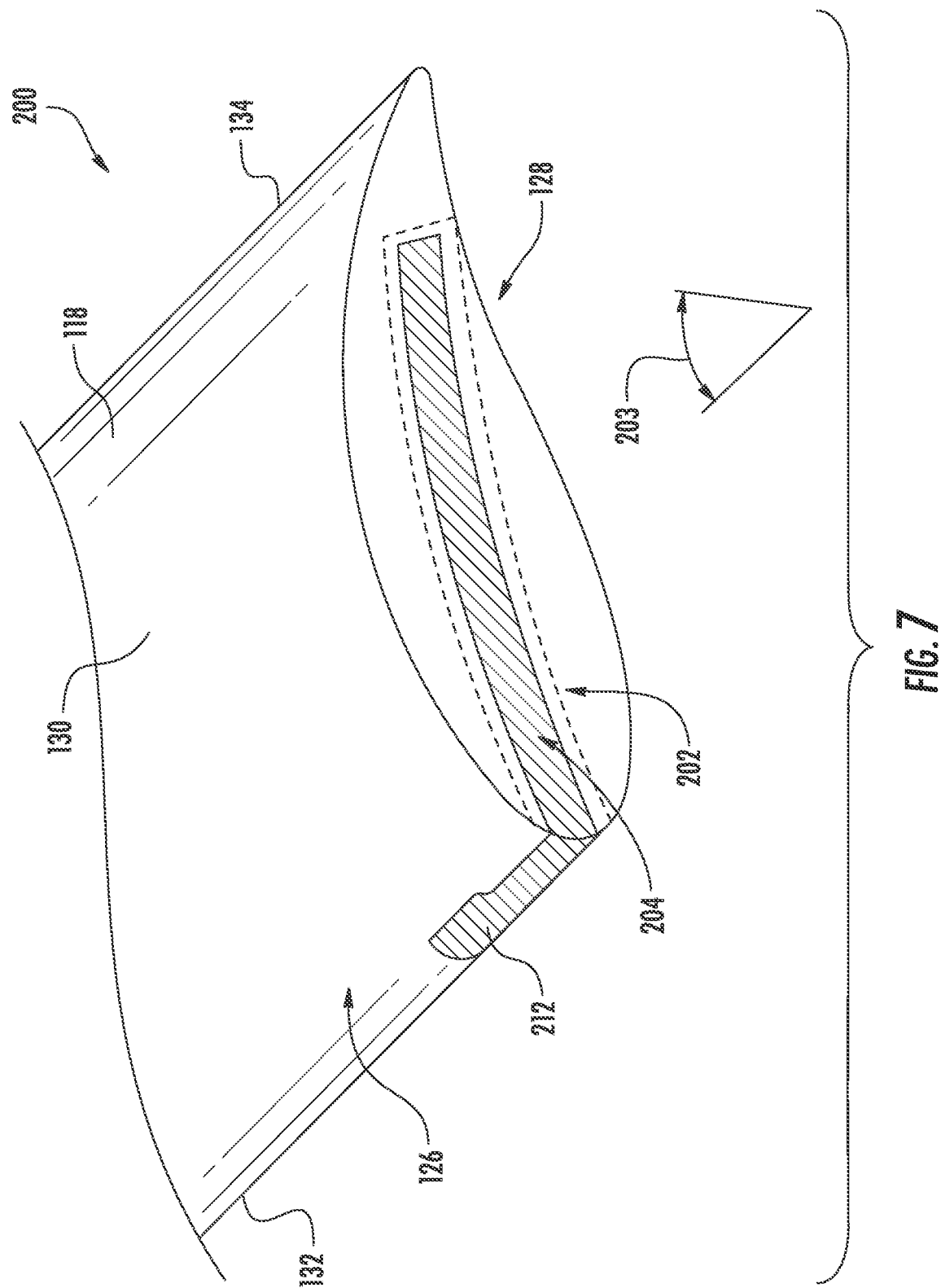
FIG. 7 illustrates a perspective view of one embodiment of a blade segment of the segmented rotor blade according to the present disclosure, particularly illustrating a receiving section lying on an arc.

Referring now to FIG. 7, in at least one embodiment, the receiving section(s) 202 and the corresponding joining structure 206 may extend along an arc 203 defined between the leading edge 132 and the trailing edge 134 of the segmented rotor blade(s) 112. For example, the receiving cavity 204 may generally follow the camber of the blade section. In an alternative embodiment, the receiving cavity 204 may lie on an arc 203 having an apogee in proximity to the pressure side 128.

In an embodiment, the insertion of the joining structure 206 into the receiving section(s) 202, in an embodiment wherein the receiving section(s) 202 and the corresponding joining structure 206 extend along an arc, may require applying a rotational force to the joining structure 206. The application of the rotational force may move the joining structure along the arc 203 defined by the receiving section(s) 202. For example, the joining structure 206 may be rotated relative to the receiving section(s) 202 about the pitch axis 116.

Figure 8:
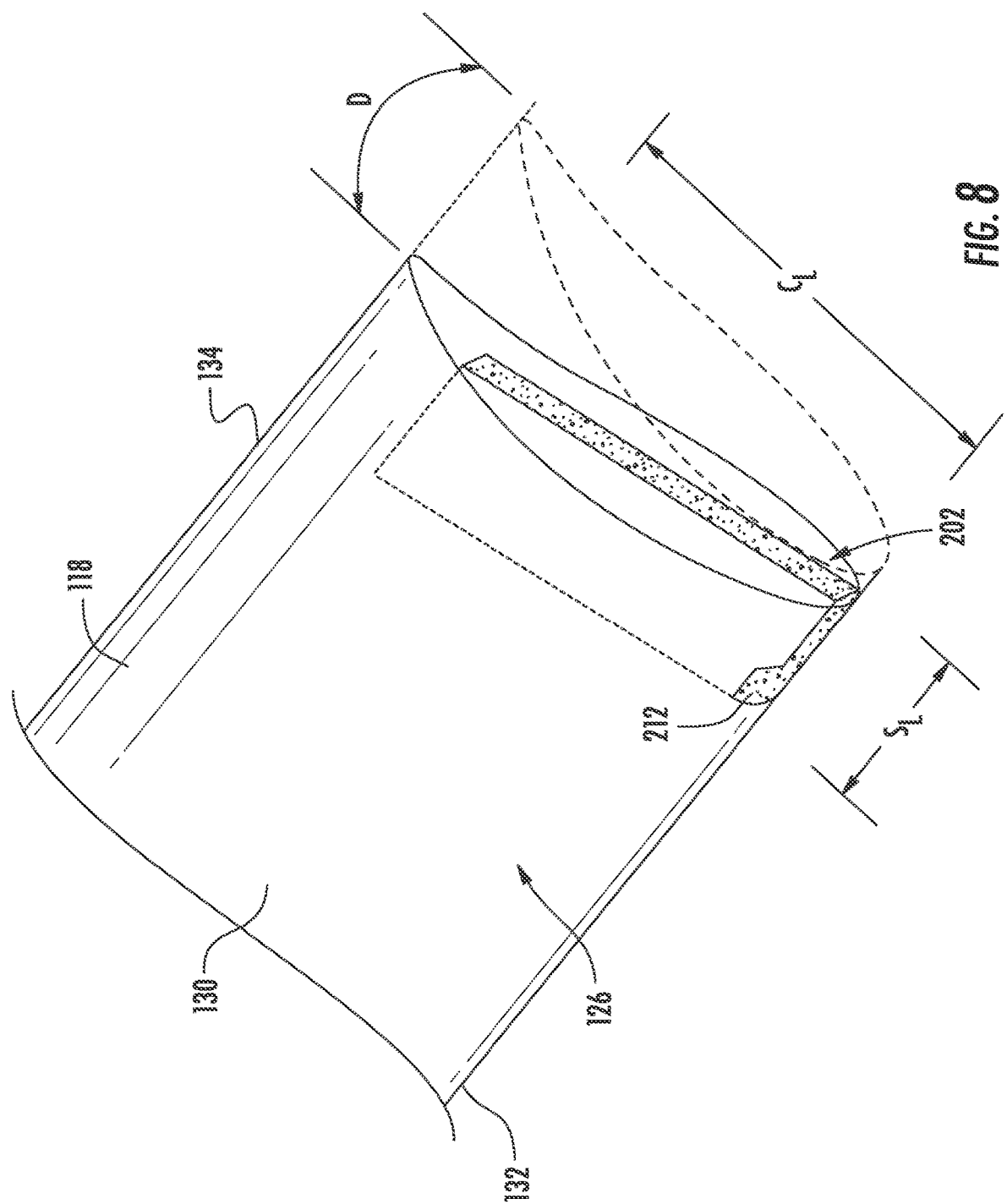
FIG. 8 illustrates a perspective view of one embodiment of a blade segment of the segmented rotor blade according to the present disclosure, particularly illustrating a receiving section deviating from a chordwise axis.

Referring now to FIG. 8, in an embodiment, the joint 122 may have a deviation (D) from the chordwise axis (C) of less than or equal to 45-degrees. The deviation (D) may be along either the leading edge 132 or the trailing edge 134. It should be appreciated that the deviation (D) may increase the chordwise length ($C_L$) and thus, the surface area of the receiving section(s) 202.

Referring now to FIG. 9, in an embodiment, the joining structure 206 may be formed independently of any blade segment. In such an embodiment, a first receiving section 220 may be formed integrally with the first blade segment 118. A second receiving section 222 may be formed integrally with the second blade segment 120. Thus, as shown, the joining structure 206 may be encapsulated by the first and second receiving sections 220, 222 so as to establish the dovetail connection ($D_T$) along the joint 122. In at least one embodiment, the joining structure 206 may be formed with the second plurality of bearing surfaces 214 encircling the joining structure 206. The joining structure 206 may have a cross-sectional shape generally resembling a bowtie or an angular hourglass. It should be appreciated that the joining structure 206 may function as a key or a spline and may be fixed or removable.

Figure 10:
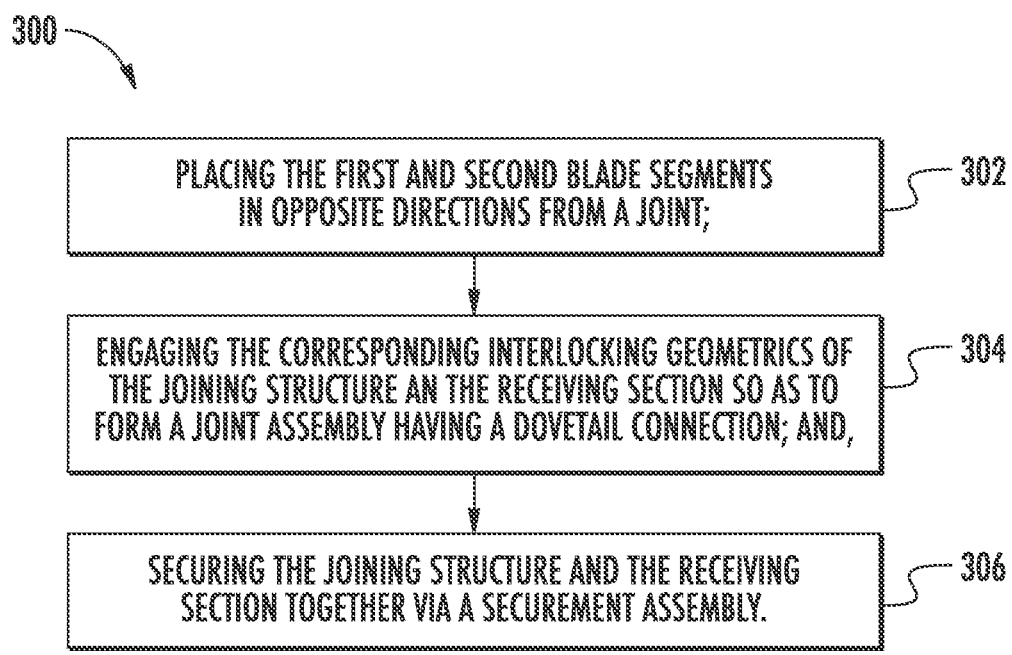
FIG. 10 illustrates a perspective view of one embodiment of a blade segment of the segmented rotor blade according to the present disclosure, particularly illustrating a plurality of joining structures and receiving sections.

Referring now to FIG. 10, in an embodiment, the joint assembly 200 may include a first plurality of receiving sections 226. The first plurality of receiving sections 226 may be distributed along the chord (C) of the segmented rotor blade(s) 112 at a first thickness location ($T_1$). The first thickness location ($T_1$) may, for example, course 2 a spar cap of the segmented rotor blade(s) 112. Each receiving section 202 of the first plurality of receiving sections 226 may define a receiving cavity 204 having a receiving profile. In such an embodiment, the joint assembly 200 may also include a first plurality of joining structures 228 received within the first plurality of receiving sections 226 at the first thickness location ($T_1$). Each joining structure 206 of the first plurality of joining structures 228 may define a joining profile (P) corresponding to the receiving profile of the corresponding receiving section 202. The joining profiles (P) and the corresponding receiving profiles may form a plurality of dovetail profiles wherein the first plurality of joining structures 228 and the first plurality of receiving sections 226 may form a plurality of dovetail connections at the first thickness location ($T_1$).

Referring still to FIG. 10, in an embodiment, the joint assembly 200 may include a second plurality of receiving sections 230. The second plurality of receiving sections 230 may be distributed along the chord (C) at a second thickness location ($T_2$). The second thickness location ($T_2$) may, for example, course 2 a spar cap of the segmented rotor blade(s) 112. Each receiving section 202 of the second plurality of receiving sections 230 may define a receiving cavity 204 having a receiving profile. In such an embodiment, the joint assembly 200 may also include a second plurality of joining structures 232 received within the second plurality of receiving sections 230 at the second thickness location ($T_2$). Each joining structure 206 of the second plurality of joining structures 232 may define a joining profile (P) corresponding to the receiving profile of the corresponding receiving section 202. The joining profiles (P) and the corresponding receiving profiles may form a plurality of dovetail profiles wherein the second plurality of joining structures 232 and the second plurality of receiving sections 230 may form a plurality of dovetail connections at the second thickness location ($T_2$).

Figure 12:
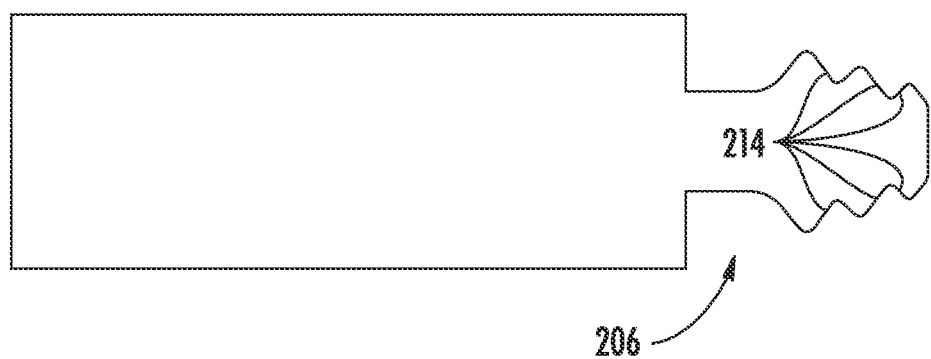
FIG. 12 illustrates a flow diagram of one embodiment of a method for joining first and second blade segments of a rotor blade of a wind turbine according to the present disclosure.

Referring to FIG. 12, a flow diagram of one embodiment of a method 300 joining first and second blade segments of a rotor blade of a wind turbine is illustrated. The method 300 may be implemented using, for instance, the joint assembly 200 discussed above with references to FIGS. 3-9. FIG. 10 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include placing the first and second blade segments in opposite directions from a joint. As shown at (304), the method 300 may include engaging the corresponding interlocking geometries of the joining structure and the receiving section so as to form a joint assembly having a dovetail connection. Additionally, as shown at (306), the method 300 may include securing the joining structure and the receiving section together via a securement assembly.

In additional embodiments, the method 300 may also, in accordance with the present disclosure, include applying a rotational force to the joining structure so as to move the joining structure along an arc defined by the at least one receiving section. The method 300 may also include inserting at least one spacer element into the at least one receiving section. The at least one spacer element may have a cross-sectional spacer profile corresponding to the cross-sectional receiving cavity and or a portion of airfoil surface.

In additional embodiments, the method 300 may also, in accordance with the present disclosure, include inserting at least one pre-tension bolt into a recess defined by the at least one receiving section and applying a torque to the pre-tension bolt so as to apply a clamping pressure onto the joining structure. In an additional embodiment, the method 300 may include applying a thermoplastic resin to at least one of the joining structure or the at least one receiving section, applying a clamping pressure to the at least one receiving section, and curing the thermoplastic resin.

In an additional embodiment, the method 300 may also, in accordance with the present disclosure, include aligning the first and second blade segments spanwise along a pitch axis and inserting the joining structure into the receiving sections of the first and second blade segments so as to establish the dovetail connection.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. A segmented rotor blade for a wind turbine, comprising: at least a first blade segment and a second blade segment extending in opposite directions from a joint, each of the first and second blade segments comprising at least one shell member defining an airfoil surface; and a joint assembly coupling the first blade segment to the second blade segment via a dovetail connection at the joint, the joint assembly comprising: at least one receiving section defining a receiving cavity having a receiving profile, a joining structure received within the at least one receiving section, the joining structure defining a joining profile corresponding to the receiving profile, the joining profile and the receiving profile forming a dovetail profile, wherein the joining structure and the at least one receiving section form the dovetail connection, and a securement assembly securing the joining structure within the at least one receiving section so as to secure the dovetail connection.

Clause 2. The segmented rotor blade of clause 1, wherein the at least one receiving section and the joining structure extend along a plane defined in a chordwise direction.

Clause 3. The segmented rotor blade of any preceding clause, wherein the at least one receiving section and the joining structure extend along an arc defined between a leading edge and a trailing edge of the segmented rotor blade.

Clause 4. The segmented rotor blade of any preceding clause, wherein the joint has a deviation from a chordwise axis of less than or equal to 45-degrees.

Clause 5. The segmented rotor blade of any preceding clause, wherein the joining structure further comprises at least one end having a contour corresponding to a portion of a contour of the airfoil surface.

Clause 6. The segmented rotor blade of any preceding clause, wherein the joint assembly further comprises: at least one spacer element contained within the at least one receiving section, the at least one spacer element having a spacer profile corresponding to at least a portion of the receiving cavity.

Clause 7. The segmented rotor blade of any preceding clause, wherein the securement assembly comprises at least one pre-tensioned bolt positioned within the joint assembly, the at least one pre-tensioned bolt oriented to exert a clamping force on the at least one receiving section so as to maintain contact between the joining structure and the at least one receiving section.

Clause 8. The segmented rotor blade of any preceding clause, wherein the securement assembly comprises a thermoplastic resin positioned between opposing bearing surfaces of the joining structure and the at least one receiving section.

Clause 9. The segmented rotor blade of any preceding clause, wherein the at least one receiving section is formed integrally with the first blade segment and wherein the joining structure is formed integrally with the second blade segment.

Clause 10. The segmented rotor blade of any preceding clause, wherein the at least one receiving section is a first receiving section formed integrally with the first blade segment, the segmented rotor blade further comprising: a second receiving section formed integrally with the second blade segment, wherein the joining structure is encapsulated by the first and second receiving sections so as to establish the dovetail connection along the joint.

Clause 11. The segmented rotor blade of any preceding clause, wherein the at least one receiving section is a first plurality of receiving sections distributed along a chord of the segmented rotor blade at a first thickness location, wherein the joining structure is a first plurality of joining structures received within the first plurality of receiving sections at the first thickness location, the joint assembly further comprising: a second plurality of receiving sections distributed along the chord at a second thickness location, each receiving section of the first and second plurality of receiving sections defining a receiving cavity having a receiving profile; a second plurality of joining structures received within the second plurality of receiving sections at the second thickness location, each joining structure of the first and second plurality of joining structures defining a joining profile corresponding to the receiving profile of the corresponding receiving section, the joining profiles and the corresponding receiving profiles forming a plurality of dovetail profiles, wherein the first and second pluralities of joining structures and the first and second pluralities of receiving sections form a plurality of dovetail connections.

12. A method for joining first and second blade segments of a rotor blade of a wind turbine, the first blade segment having at least one receiving section defining a receiving cavity having a receiving profile, the second blade segment having a joining structure defining a joining profile, the receiving and joining profiles having corresponding interlocking geometries, the method comprising: placing the first and second blade segments in opposite directions from a joint; engaging the corresponding interlocking geometries of the joining structure and the receiving section so as to form a joint assembly having a dovetail connection; and securing the joining structure and the receiving section together via a securement assembly.

Clause 13. The method of any preceding clause, wherein engaging the corresponding interlocking geometries of the joining structure and the receiving section further comprises applying a rotational force to the joining structure so as to move the joining structure along an arc defined by the at least one receiving section.

Clause 14. The method of any preceding clause, wherein the joint has a deviation from a chordwise axis of less than or equal to 45-degrees.

Clause 15. The method of any preceding clause, further comprising: inserting at least one spacer element into the at least one receiving section, the at least one spacer element having a cross-sectional spacer profile corresponding to the cross-section of the receiving cavity and/or a portion of airfoil surface.

Clause 16. The method of any preceding clause, wherein securing the joining structure and the receiving section further comprises: inserting at least one pre-tensioned bolt into a recess defined by the at least one receiving section; and applying a torque to the pre-tensioned bolt so as to apply a clamping pressure onto the joining structure.

Clause 17. The method of any preceding clause, wherein securing the joining structure and the receiving section further comprises: applying a thermoplastic resin to at least one of the joining structure or the at least one receiving section; applying a clamping pressure to the at least one receiving section; and curing the thermoplastic resin.

Clause 18. The method of any preceding clause, wherein the second blade segment further comprises at least one receiving section, the method further comprising: aligning the first and second blade segments spanwise along a pitch axis, wherein engaging the corresponding interlocking geometries comprises inserting the joining structure into the receiving sections of the first and second blade segments so as to establish the dovetail connection.

Clause 19. A wind turbine, comprising: a tower secured atop a foundation; a nacelle mounted atop the tower; and a rotor mounted to the nacelle, the rotor comprising a rotatable hub having at least one segmented rotor blade coupled thereto, the at least one segmented rotor blade comprising: at least a first blade segment and a second blade segment extending in opposite directions from a joint, each of the first and second blade segments comprising at least one shell member defining an airfoil surface, and a joint assembly coupling the first blade segment to the second blade segment via a dovetail connection at the joint, the joint assembly comprising: at least one receiving section defining a receiving cavity having a receiving profile, a joining structure received within the at least one receiving section, the joining structure defining a joining profile corresponding to the receiving profile, the joining profile and the receiving profile forming a dovetail profile, wherein the joining structure and the at least one receiving cavity form the dovetail connection, and a securement assembly securing the joining structure within the at least one receiving section so as to secure the dovetail connection.

Clause 20. The wind turbine of any preceding clause, wherein the at least one receiving section and the joining structure extend along an arc defined between a leading edge and a trailing edge of the segmented rotor blade.

What is claimed is:

1. A segmented rotor blade for a wind turbine, comprising:
   at least a first blade segment and a second blade segment extending in opposite directions from a joint, each of the first and second blade segments comprising at least one shell member defining an airfoil surface; and
   a joint assembly coupling the first blade segment to the second blade segment via a dovetail connection at the joint, the joint assembly comprising:
      at least one receiving section defining a receiving cavity having a receiving profile,
      a joining structure received within the at least one receiving section, the joining structure defining a joining profile corresponding to the receiving profile, the joining profile and the receiving profile forming a dovetail profile, wherein the joining structure and the at least one receiving section form the dovetail connection, wherein the at least one receiving section and the joining structure extend along an arc defined between a leading edge and a trailing edge of the segmented rotor blade, and
      a securement assembly securing the joining structure within the at least one receiving section so as to secure the dovetail connection.

2. The segmented rotor blade of claim 1, wherein the at least one receiving section and the joining structure extend along a plane defined in a chordwise direction.

3. The segmented rotor blade of claim 1, wherein the joint has a deviation from a chordwise axis of less than or equal to 45-degrees.

4. The segmented rotor blade of claim 1, wherein the joining structure further comprises at least one end having a contour corresponding to a portion of a contour of the airfoil surface.

5. The segmented rotor blade of claim 1, wherein the joint assembly further comprises:
   at least one spacer element contained within the at least one receiving section, the at least one spacer element having a spacer profile corresponding to at least a portion of the receiving cavity.

6. The segmented rotor blade of claim 1, wherein the securement assembly comprises at least one pre-tensioned bolt positioned within the joint assembly, the at least one pre-tensioned bolt oriented to exert a clamping force on the at least one receiving section so as to maintain contact between the joining structure and the at least one receiving section.

7. The segmented rotor blade of claim 1, wherein the securement assembly comprises a thermoplastic resin positioned between opposing bearing surfaces of the joining structure and the at least one receiving section.

8. The segmented rotor blade of claim 1, wherein the at least one receiving section is formed integrally with the first blade segment and wherein the joining structure is formed integrally with the second blade segment.

9. The segmented rotor blade of claim 1, wherein the at least one receiving section is a first receiving section formed integrally with the first blade segment, the segmented rotor blade further comprising:
   a second receiving section formed integrally with the second blade segment, wherein the joining structure is encapsulated by the first and second receiving sections so as to establish the dovetail connection along the joint.

10. The segmented rotor blade of claim 1, wherein the at least one receiving section is a first plurality of receiving sections distributed along a chord of the segmented rotor blade at a first thickness location, wherein the joining structure is a first plurality of joining structures received within the first plurality of receiving sections at the first thickness location, the joint assembly further comprising:
    a second plurality of receiving sections distributed along the chord at a second thickness location, each receiving section of the first and second plurality of receiving sections defining a receiving cavity having a receiving profile;
    a second plurality of joining structures received within the second plurality of receiving sections at the second thickness location, each joining structure of the first and second plurality of joining structures defining a joining profile corresponding to the receiving profile of the corresponding receiving section, the joining profiles and the corresponding receiving profiles forming a plurality of dovetail profiles, wherein the first and second pluralities of joining structures and the first and second pluralities of receiving sections form a plurality of dovetail connections.

11. A method for joining first and second blade segments of a rotor blade of a wind turbine, the first blade segment having at least one receiving section defining a receiving cavity having a receiving profile, the second blade segment having a joining structure defining a joining profile, the receiving and joining profiles having corresponding interlocking geometries, the method comprising:
    placing the first and second blade segments in opposite directions from a joint;
    engaging the corresponding interlocking geometries of the joining structure and the receiving section so as to form a joint assembly having a dovetail connection, wherein engaging the corresponding interlocking geometries of the joining structure and the receiving section further comprises applying a rotational force to the joining structure so as to move the joining structure along an arc defined by the at least one receiving section; and
    securing the joining structure and the receiving section together via a securement assembly.

12. The method of claim 11, wherein the joint has a deviation from a chordwise axis of less than or equal to 45-degrees.

13. The method of claim 11, further comprising:
    inserting at least one spacer element into the at least one receiving section, the at least one spacer element having a cross-sectional spacer profile corresponding to the cross-section of the receiving cavity and/or a portion of airfoil surface.

14. The method of claim 11, wherein securing the joining structure and the receiving section further comprises:
    inserting at least one pre-tensioned bolt into a recess defined by the at least one receiving section; and
    applying a torque to the pre-tensioned bolt so as to apply a clamping pressure onto the joining structure.

15. The method of claim 11, wherein securing the joining structure and the receiving section further comprises:
    applying a thermoplastic resin to at least one of the joining structure or the at least one receiving section;
    applying a clamping pressure to the at least one receiving section; and
    curing the thermoplastic resin.

16. The method of claim 11, wherein the second blade segment further comprises at least one receiving section, the method further comprising:

aligning the first and second blade segments spanwise along a pitch axis, wherein engaging the corresponding interlocking geometries comprises inserting the joining structure into the receiving sections of the first and second blade segments so as to establish the dovetail connection.

17. A wind turbine, comprising:

a tower secured atop a foundation;

a nacelle mounted atop the tower; and a rotor mounted to the nacelle, the rotor comprising a rotatable hub having at least one segmented rotor blade coupled thereto, the at least one segmented rotor blade comprising:

at least a first blade segment and a second blade segment extending in opposite directions from a joint, each of the first and second blade segments comprising at least one shell member defining an airfoil surface, and a joint assembly coupling the first blade segment to the second blade segment via a dovetail connection at the joint, the joint assembly comprising:

at least one receiving section defining a receiving cavity having a receiving profile, a joining structure received within the at least one receiving section, the joining structure defining a joining profile corresponding to the receiving profile, the joining profile and the receiving profile forming a dovetail profile, wherein the joining structure and the at least one receiving cavity form the dovetail connection, wherein the at least one receiving section and the joining structure extend along an arc defined between a leading edge and a trailing edge of the segmented rotor blade, and a securement assembly securing the joining structure within the at least one receiving section so as to secure the dovetail connection.

* * * * *